United States Patent
Pardoen et al.

(10) Patent No.: US 7,515,050 B2
(45) Date of Patent: Apr. 7, 2009

(54) VERY HIGH FREQUENCY PASSIVE TRANSPONDER, IN UHF FREQUENCY BAND, WITH ACTIVE VOLTAGE MULTIPLIER OR BOOSTER AT THE ENTRY OF ITS LOGIC CIRCUIT

(75) Inventors: Matthijs Pardoen, Le Landeron (CH); Olivier Desjeux, Le Landeron (CH)

(73) Assignee: EM Microelectronic-Marin SA, Marin (CH)

( * ) Notice: Subject to any disclaimer, the term of this patent is extended or adjusted under 35 U.S.C. 154(b) by 566 days.

(21) Appl. No.: 11/245,014

(22) Filed: Oct. 7, 2005

(65) Prior Publication Data

US 2006/0087301 A1 Apr. 27, 2006

(30) Foreign Application Priority Data

Oct. 7, 2004 (EP) ................... 04023899

(51) Int. Cl.
*G08B 13/14* (2006.01)
*G05F 1/10* (2006.01)
*H04B 1/38* (2006.01)
*H02M 3/18* (2006.01)

(52) U.S. Cl. ................. 340/572.7; 340/572.8; 340/10.1; 340/343; 323/282; 455/73; 455/334; 363/59

(58) Field of Classification Search ................ 340/10, 340/572.7, 10.1, 572.8, 363, 343; 348/296, 348/207, 220, 221; 363/59, 60, 61; 343/10.1; 455/73, 334

See application file for complete search history.

(56) References Cited

U.S. PATENT DOCUMENTS

| | | | | |
|---|---|---|---|---|
| 3,942,047 A | * | 3/1976 | Buchanan | .................... 327/543 |
| 4,979,088 A | * | 12/1990 | Misaki et al. | ................. 363/60 |
| 5,267,201 A | | 11/1993 | Foss et al. | |
| 5,598,210 A | * | 1/1997 | Toohey | ....................... 348/296 |
| 6,437,609 B1 | | 8/2002 | Chehadi | |
| 6,549,064 B2 | | 4/2003 | Bandy et al. | |
| 6,664,770 B1 | | 12/2003 | Bartels | |
| 6,980,448 B2 | * | 12/2005 | Foss et al. | ..................... 363/60 |
| 6,989,750 B2 | * | 1/2006 | Shanks et al. | ............ 340/572.4 |
| 7,202,640 B2 | * | 4/2007 | Morita | ....................... 323/205 |
| 2002/0167405 A1 | | 11/2002 | Shanks et al. | |

(Continued)

FOREIGN PATENT DOCUMENTS

FR 2 750 227 A1 12/1997

(Continued)

OTHER PUBLICATIONS

European Search Report issued in corresponding application EP 04 02 3899 completed Apr. 13, 2005.

(Continued)

*Primary Examiner*—Daniel Wu
*Assistant Examiner*—Fekadeselassie Girma
(74) *Attorney, Agent, or Firm*—Griffin & Szipl, P.C.

(57) ABSTRACT

The passive transponder comprises an antenna (2) connected to an integrated circuit (6) the analogue part of which includes a passive voltage rectifier (8) supplying a rectified voltage ($V_{DC1}$) and an active multiplier or booster (16) for said rectified voltage which is formed by a capacitor (C2) switched to a relatively low frequency, for example 1 MHz, by means of switches formed by transistors (18 to 21) controlled using an oscillator (24).

5 Claims, 2 Drawing Sheets

U.S. PATENT DOCUMENTS

2003/0189483 A1* 10/2003 Saitoh et al. ............... 340/10.1
2003/0231566 A1* 12/2003 Smith et al. .............. 369/47.25
2005/0052283 A1*  3/2005 Collins et al. ............ 340/572.7
2005/0231438 A1* 10/2005 Pillai et al. ................. 343/860
2006/0145865 A1*  7/2006 Forster .................... 340/572.8

OTHER PUBLICATIONS

Karthaus, Udo et al., "Fully Integrated Passive UHF RFID Tansponder IC with 16.7-uW Minimum RF Input Power," IEEE Journal of Solid-State Circuits, vol. 38, No. 10, Oct. 2003, pp. 1602-1608.

* cited by examiner

VERY HIGH FREQUENCY PASSIVE TRANSPONDER, IN UHF FREQUENCY BAND, WITH ACTIVE VOLTAGE MULTIPLIER OR BOOSTER AT THE ENTRY OF ITS LOGIC CIRCUIT

This application claims priority on European Patent Application No. 04023899.0, filed Oct. 7, 2004, the entire disclosure of which is incorporated herein by reference.

FIELD OF THE INVENTION

The present invention concerns a passive transponder arranged for receiving a very high frequency electromagnetic signal, particularly in the UHF range.

In particular, the invention concerns a transponder of this type formed of an antenna and an integrated circuit incorporating the voltage rectifying and multiplying means for the alternating signal received by the transponder for powering the logic circuit of the integrated circuit.

BACKGROUND OF THE INVENTION

A transponder of the aforementioned type is presented in particular in the article "Fully Integrated Passive UHF RFID transponder IC with 16.7 µW minimum RF input power", IEEE Journal of Solid-State Circuits, vol. 38, No 10, October 2003.

A similar transponder is also disclosed in U.S. Pat. No. 6,549,064.

The voltage rectifying and multiplying means for the signal received by the transponder disclosed in the aforementioned article are shown in FIG. 1 annexed hereto. These means comprise 2n+2 diodes in series, n being the number of voltage multiplication stages, and two series of N+1 capacitances, $C_1$ to $C_{n+1}$ and $C'_{n+1}$, arranged in parallel on either side of the diodes.

This type of voltage multiplier has significant drawbacks which decrease the output voltage actually provided and increase energy dissipation, which thus limits the communication distance between a reader and the transponder.

It is an object of the present invention to provide a transponder, arranged for receiving very high frequency signals, in particular UHF signals, which can communicate with a reader or a transceiver, transmitting at a given power, at a greater distance than that of the aforecited transponders of the prior art.

Within the scope of current developments, the inventors have observed that the analogue part of the integrated circuit defines an input capacitance, which is coupled to the inductive antenna. This input capacitance and the antenna together form a resonant circuit that dissipates a certain amount of energy proportional to the frequency of the received electromagnetic signal. An antenna has a certain aperture enabling it to pick up a certain amount of energy from the reader's electromagnetic field that reaches the antenna. The energy received by the transponder is dissipated in said resonant circuit and is also consumed by the integrated circuit. For a given quality factor, the energy dissipated by the resonant circuit is proportional to the energy stored therein. This stored energy is equal to $0.5 \times C_E \times V_P^2$, $C_E$ being the input capacitance and $V_P$ the maximum voltage at the terminals of said input capacitance. Thus, in order to decrease the dissipated energy, $C_E$ should be decreased. For a given $V_P$, by decreasing the input capacitance, one can thus decrease the energy that has to be picked up by the antenna in order for the transponder to work. This is what the present invention proposes. This results in an increase in the communication distance between a given reader and the transponder.

It will also be noted that the lower the input voltage $V_P$ is kept for a determined rectified voltage at the terminals of the transponder logic circuit, the greater the communication distance can be. The voltage rise contributes to obtaining this effect. The more efficient the voltage rise, the greater the communication distance.

The received signal voltage rectifying and multiplying means proposed in the prior art of FIG. 1 have a relatively high input capacitance due in particular to the capacitance series $C_2$ to $C_{n+1}$, which is added to capacitance $C_1$ of an input voltage rectifier circuit.

Next, diodes $D_3$ to $D_{2n+1}$ are floating diodes with the anode or cathode thereof subjected to a relatively significant alternating signal generated by the received RF signal. As shown in FIG. 2, odd coefficient diodes $D_{2n+1}$, N=1 to n, each have, in a standard CMOS monolithic integration, a stray capacitance $CP_N$ with the substrate which decreases the voltage rise through said diodes. This results in a decrease in the efficiency of the voltage booster, which is a major drawback.

In order to overcome the aforementioned drawbacks, the present invention proposes a passive transponder comprising alternating voltage rectifying and multiplying means for the received electromagnetic signal, which is characterized in that said means comprise a passive rectifier supplying a rectified voltage and a voltage multiplier or booster arranged downstream of the passive rectifier and formed by capacitors switched to a lower frequency than said received signal frequency.

Preferably, the capacitors are switched at a relatively low frequency using transistors defining active switches.

BRIEF DESCRIPTION OF THE DRAWINGS

The present invention is described hereinafter with referenced to the annexed drawing, given by way of non-limiting example, in which.

DETAILED DESCRIPTION OF THE ILLUSTRATIVE EMBODIMENTS

Figure 1:
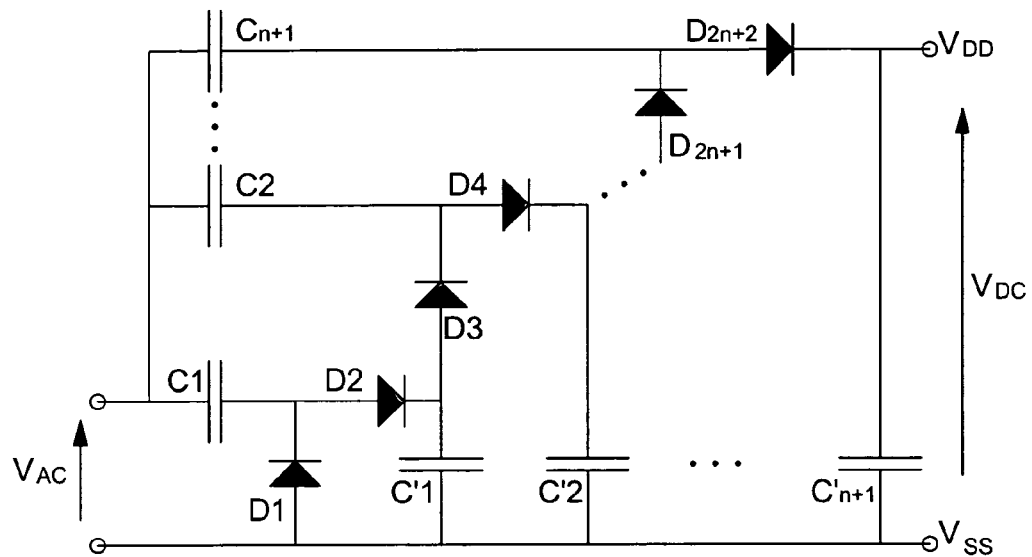
FIGS. 1 and 2, already described, show a voltage rectifier-booster implemented in a passive transponder of the prior art.
Figure 2:
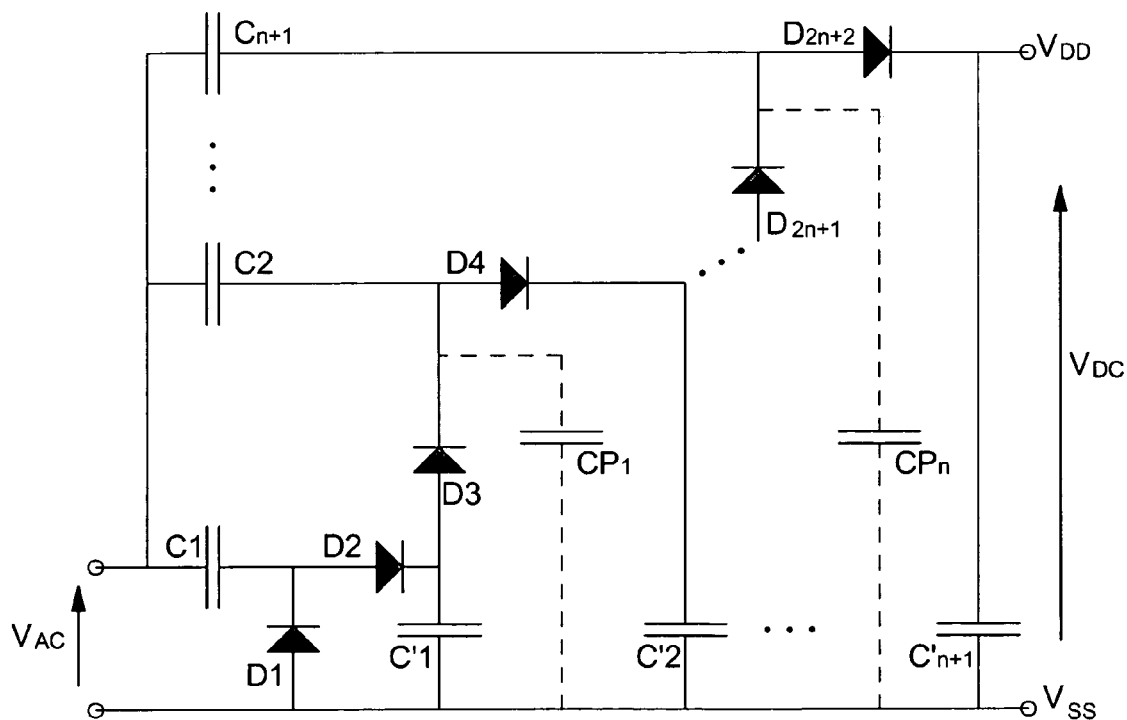
Figure 3:
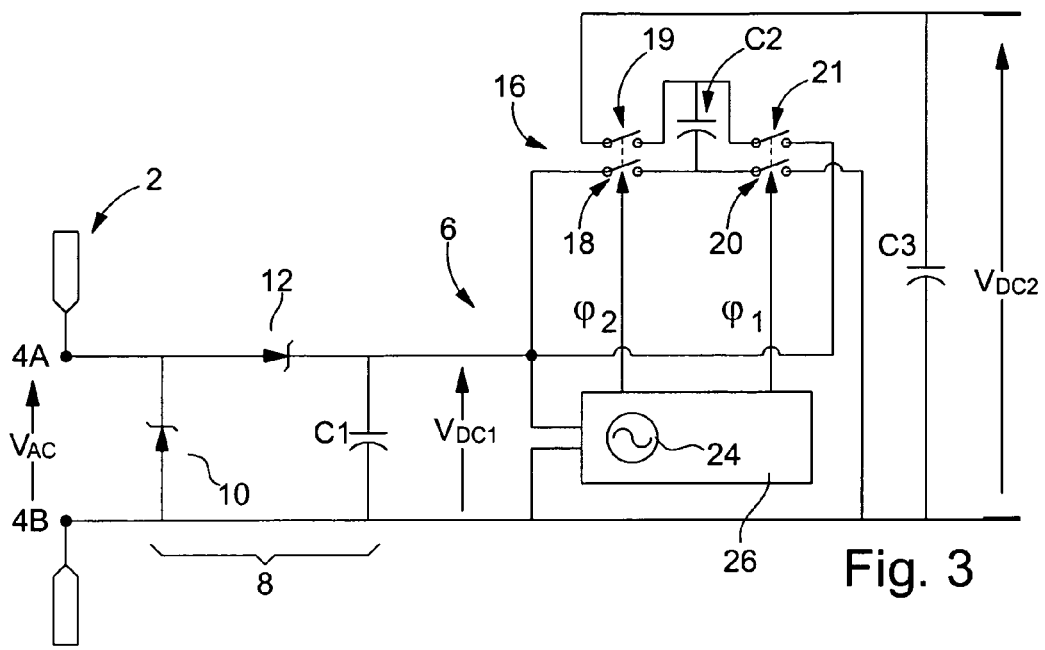
FIG. 3 is a partial electronic diagram of an embodiment of the transponder according to the invention.

FIG. 3 shows an analogue part of the integrated circuit of a passive transponder according to the invention coupled to an electromagnetic signal reception antenna generating at input a certain alternating voltage. This analogue part defines means for rectifying and multiplying said alternating voltage.

The transponder comprises an antenna 2 electrically connected to input terminals 4A and 4B of integrated circuit 6 of which only the continuous voltage supply means of the logic circuit are shown. Circuit 6 comprises a passive rectifier 8 whose input terminals are connected to antenna 2. This rectifier 8 comprises, in a conventional manner, two diodes 10 and 12, preferably Schottky diodes, and a capacitor C1 at the terminals of which a rectified voltage $V_{DC1}$ is obtained. Downstream of rectifier 8, there is arranged circuit 16 for doubling continuous voltage $V_{DC1}$. This circuit 16 is formed of a capacitor C2 switched using four transistors 18, 19, 20 and 21 and a capacitor C3 at the terminals of which voltage $V_{DC2}$ is obtained, equal to substantially twice voltage $V_{DC1}$.

Figure 5:
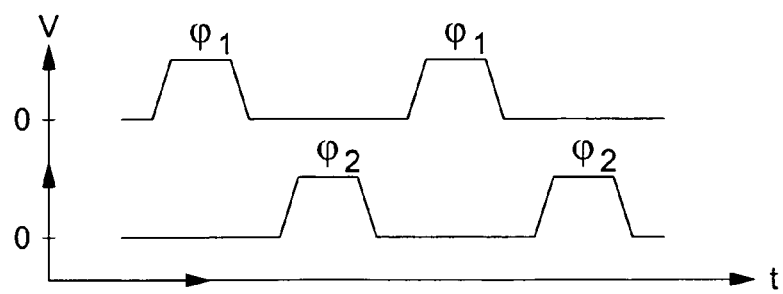
FIG. 5 shows two control signals applied to the voltage multiplier of the transponder of FIG. 3 or 4.

The transistors are actuated via control means 26 comprising an oscillator 24 operating at a low frequency. Transistors 18 to 21 define four active switches which are opened and closed two by two alternately by two control signals $\phi_1$ and $\phi_2$ supplied by control means 26. These control signals $\phi_1$ and $\phi_2$ are not superposed as shown in FIG. 5.

Figure 4:
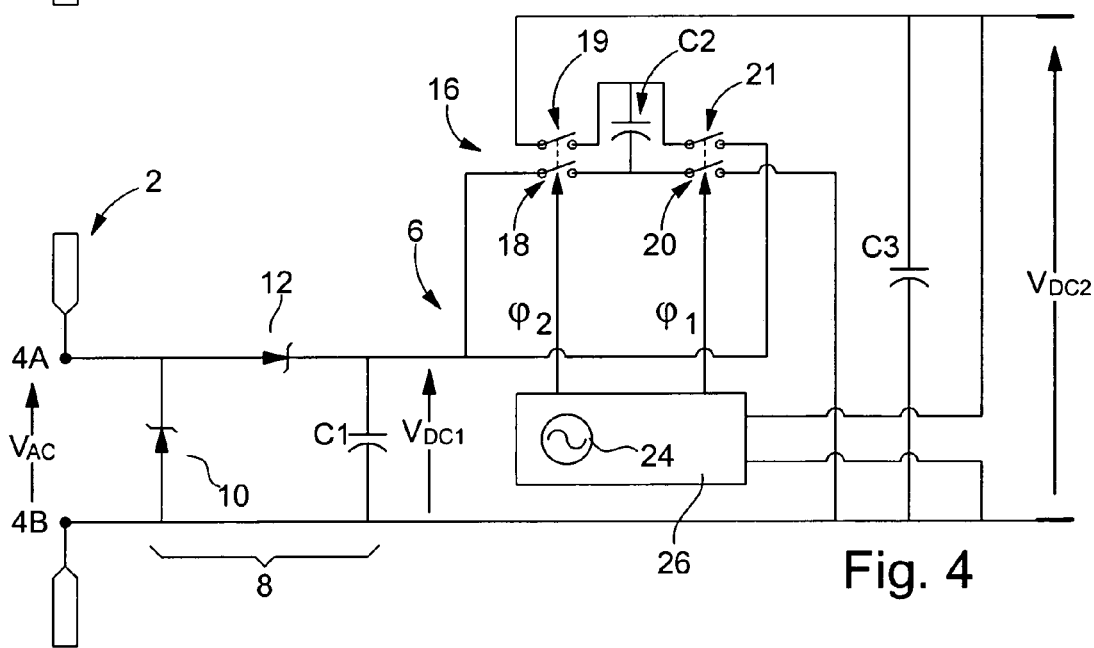
FIG. 4 is an alternative embodiment of the transponder of FIG. 3.

In the variant of FIG. 4, the oscillator or pulse generator 24 is powered by voltage $V_{DC1}$. By way of example, the voltage $V_{DC2}$ necessary for the logic circuit to operate is approximately 1 Volt. Thus voltage $V_{DC1}$ has to be substantially equal to 0.5 Volt. Those skilled in the art can make a pulse generator or internal clock that already operates with a supply voltage of around 0.5 Volt. Thus active voltage doubler 16 can be operational at the minimum voltage provided for activating the transponder logic circuit since the oscillator operates with a voltage at least two times smaller than said minimum voltage.

In another embodiment shown in FIG. 4, the voltage booster transistor control means comprising pulse generator 24 are powered by the voltage $V_{DC2}$ applied to the logic circuit. Thus, in an initial phase, the multiplier operates in a passive mode or control means 26 comprise a start circuit for carrying out at least a first activation of the transistors. Those skilled in the art know how to implement such variants.

By way of example, capacitor C2 is switched to a frequency of around one MHz. The use of active transistors switched to a relatively low frequency for raising the rectified voltage of the signal received by the antenna enables the input capacitance of the integrated circuit to be significantly reduced and its quality factor to be increased relative to the prior art transponder previously described. Thus energy losses in the analogue part of the transponder are decreased and the voltage rise is more efficient. This results in an increase in the possible communication distance between such a transponder and a reader associated therewith.

It will be noted that the oscillator provided for controlling the voltage doubler transistors can advantageously be the oscillator integrated in the transponder circuit which is provided for clocking the logic circuit, in particular in the case of the variant of FIG. 4.

The embodiment described hereinbefore concerns an active voltage doubler. Other successive stages can be provided each for multiplying the voltage by two. Those skilled in the art can also make a voltage tripler on the basis of the principle described here.

The invention claimed is:

1. Passive transponder arranged for receiving a very high frequency electromagnetic signal in the UHF range, the passive transponder including:
   (A) an antenna; and
   (B) an integrated circuit connected to said antenna, said integrated circuit including
      i. analogue means for rectifying alternating input voltage of said received electromagnetic signal and for multiplying or boosting said alternating input voltage, wherein said rectifying and multiplying means powers a logic circuit of said integrated circuit, wherein said alternating input voltage rectifying and multiplying means includes
         a. a passive rectifier supplying a rectified voltage; and
         b. an active voltage multiplier or booster arranged downstream of the passive rectifier, said voltage multiplier or booster including at least one capacitor switched to a lower frequency than said frequency of said received signal.

2. Transponder according to claim 1, wherein said voltage multiplier or booster further includes transistors forming current switches, wherein said transistors are switched at a relatively low frequency.

3. Transponder according to claim 1, including an oscillator integrated in said integrated circuit and used for clocking said logic circuit and generating control pulses for said voltage multiplier or booster.

4. Transponder according to claim 1, wherein said voltage multiplier is a doubler of said rectifier voltage by said passive rectifier.

5. Transponder according to claim 2, including an oscillator integrated in said integrated circuit and used for clocking said logic circuit and generating control pulses for said voltage multiplier or booster.

* * * * *